United States Patent [19]

Plattner et al.

[11] 4,250,955
[45] Feb. 17, 1981

[54] SELF-SERVICE REPLENISHABLE FOOD CABINET

[75] Inventors: Robert F. Plattner, Spring Lake; Raymond J. Arend; John A. Verberkmoes, both of Grand Haven, all of Mich.

[73] Assignee: Bastian Blessing Co. Inc., Grand Haven, Mich.

[21] Appl. No.: 922,745

[22] Filed: Jul. 7, 1978

[51] Int. Cl.³ .............................................. F25B 29/00
[52] U.S. Cl. ........................................ 165/14; 165/64;
165/DIG. 25; 165/137; 219/387; 219/400;
62/131; 312/236
[58] Field of Search ................. 165/14, 48, 58, 61,
165/64, 137; 312/116, 126, 236; 219/385, 386,
387, 400; 62/131, 180, 329, 419

[56] References Cited
U.S. PATENT DOCUMENTS

| | | | |
|---|---|---|---|
| 3,090,209 | 5/1963 | Hubacker | 62/180 |
| 3,170,541 | 2/1965 | Werner | 312/236 X |
| 3,199,579 | 8/1965 | Foster et al. | 219/386 X |
| 3,327,092 | 6/1967 | Wilson | 312/236 X |
| 3,605,431 | 9/1971 | Carson | 62/329 X |
| 3,872,688 | 3/1975 | Tillman | 62/329 |
| 3,911,248 | 10/1975 | Buday et al. | 219/400 |
| 3,999,475 | 12/1976 | Roderick | 312/236 X |
| 4,010,349 | 3/1977 | Lee | 219/401 |

Primary Examiner—Albert W. Davis
Assistant Examiner—Margaret A. Focarino
Attorney, Agent, or Firm—Sixbey, Friedman & Leedom

[57] ABSTRACT

A series of like-shelved, convertible refrigerating and heating cabinets, accessible from either one of two sides thereof through self-closing glass doors for self-service and replenishment of prepared food and drinks, and following a door opening of any duration over periods of intermittent replenishing, dispensing and storage conditions, providing fast automatic rapid air condition recovery for uniformity of refrigeration, or heating, and/or humidification of miscellaneous food products accessibly displayed.

8 Claims, 7 Drawing Figures

SELF-SERVICE REPLENISHABLE FOOD CABINET

BACKGROUND OF THE INVENTION

Whether one or more cabinets are used in a cafeteria-type self-service food line depends upon the number and variety of dishes offered to the patrons, including hot and cold items requiring separate replenishable dispensing cabinets that provide critical display temperatures required for both serving and overnight storage.

A variety of countertop dishes, which includes hot and cold food, generally require a long display line for selection and serving, and some logical sequence of items is attempted for the convenience of patrons that move along a self-serving rail with trays. However, patrons very often go back to return or pick up a dish which was previously considered. Even with a short self-serving counter of display cabinets, this "change of mind" phenomenon causes undesirable confusion for everyone under crowded conditions, and, the number of cabinets required for different dishes add to the confusion and display dispensing expense.

In the interest of conserving floor space and reducing "change of mind" trips, their length and confusion, it is particularly desirable to concentrate a group of like selections where like dishes may be viewed preferably within a short counter serving distance on see through vertically spaced shelves so that orderly selections can be made quickly as patrons move along. Also, in reducing self-service confusion, it is desirable and economical for both the customers and the proprietor, to enclose certain groups of selectible items on vertically spaced shelves and economically chill, or heat, and/or humidify them on the shelves under sanitary conditions above a counter level and in cabinets having rollable, self-closing doors on both sides that are easily opened for replenishment from either side and dispensing on the opposite side depending on the relative direction of customer movement; or the nearness to the kitchen or to extra storage refrigerators; the desired temperature of serving dishes; and the relative locations of cold and hot items in the cabinet compartments with or without the doors being held open or room drafts being involved.

SUMMARY OF THE INVENTION

In the present invention, a self service replenishable food cabinet is provided to maintain food under a predetermined temperature and/or humidity condition and; when the doors are opened to load or remove food items, instrumentation responds in relation to the period of time that the doors or doors are open, arrests air circulation to quickly restore the condition, and corrects recovery for the time lost in relation to the length of time of opening.

With use of the augmenting instrumentation, air circulation in the cabinet is cut off while the door is open and when closed is restored with a surge related to the timed openness of the door. The air is conditioned, i.e., refrigerated, or heated and/or humidified, as the case may be, and is quickly recirculated in a multi-path pattern in which the air is drawn from a location such as the top of the cabinet above the stored food which is not likely to be exposed to incoming room air. The air is then reconditioned with the augmented timing and is preferably returned with relative soft flow in vertically spaced, horizontally directed short individual paths in the food compartments under the shelves, as related to the levels of the respective shelves supporting the food. The shelves are in turn preferably foraminated for the upwardly fast heat exchange contact of the air with the food and trays. Thereby, each portion of conditioned air is distributed evenly in many like paths and initially surrenders its rapid conditioning effect to a limited volume of food stored on the respective immediately adjacent shelves. Thereafter, the depleted air streams are collectively recirculated in substantially the same depleted condition with other portions of air back through the circulating fan and heat exchanger whereby a substantially identical delivery and reconditioning of all portions of the air load quickly restores uniform storage conditions between the times of the door openings whether it be refrigerated, heated and/or humidified, or both.

Another aspect of the invention is that a plurality of cabinets esthetically matched and combined as a unit in appearance can serve and be replenished from both sides with maximum access for each. They can be arranged end to end in either direction or unitized with very little usable inside space above the counter level being occupied by any mechanism. Preferably, the cabinet space with its overlapping transparent sliding doors on both sides can be internally divided by a vertical transparent plastic heat insulating partition removably disposed crosswise between the inner paralled doors. Thus, plural compartments may be provided to handle separately hot or cooled food on one side and room temperature products on the other side, or, hot food on one side and chilled food on the other with versatility if a self-serving load does not require more display space than that provided by one cabinet. Otherwise, the divider may be removed and the cabinet operated for one selective purpose, either for chilling or heating food servings.

IN THE DRAWINGS

Figure 1:
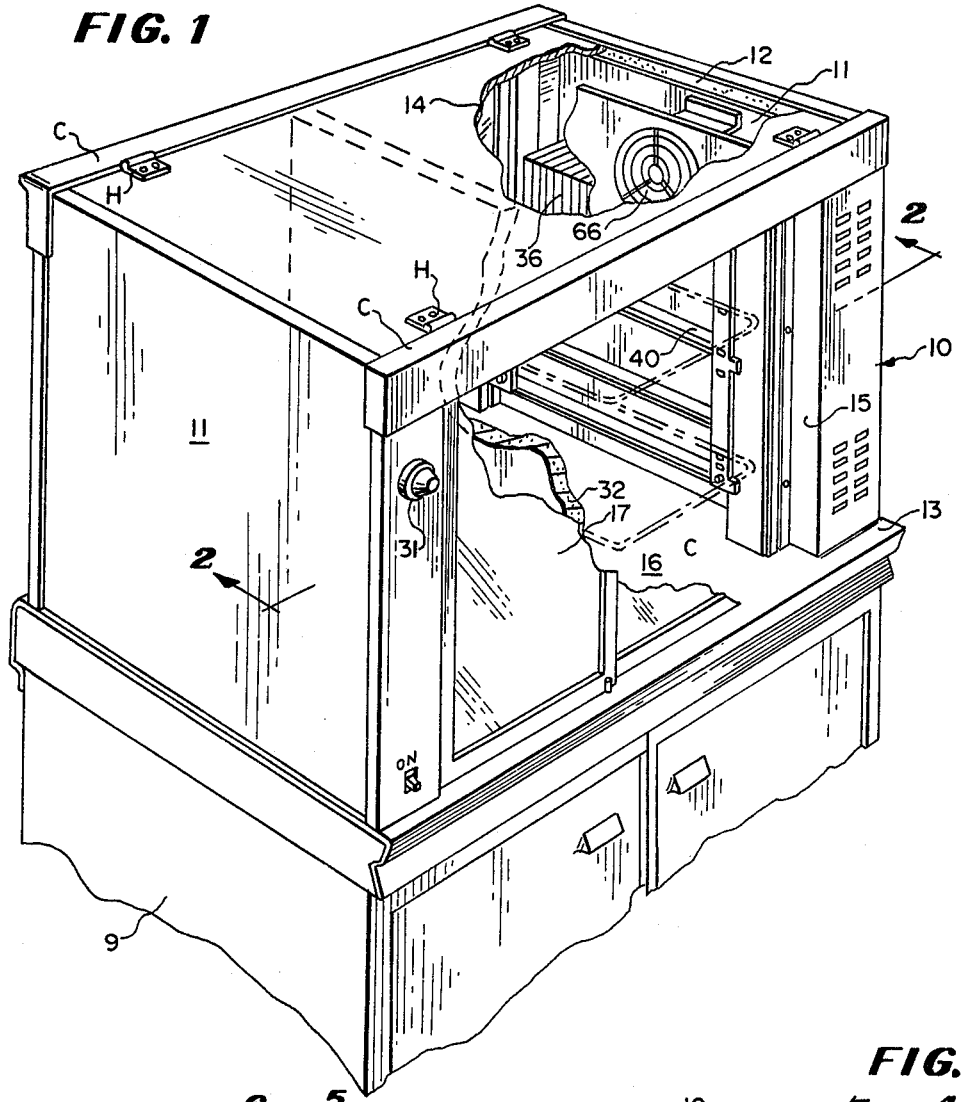
FIG. 1 is an isometric view, partly in section, of a self-serving cabinet, readily convertible, optionally, in whole or in part, for displaying and vending hot or cold food, or both, in a compartment accessible through self-closing transparent access doors located on either or both sides.
Figure 2:
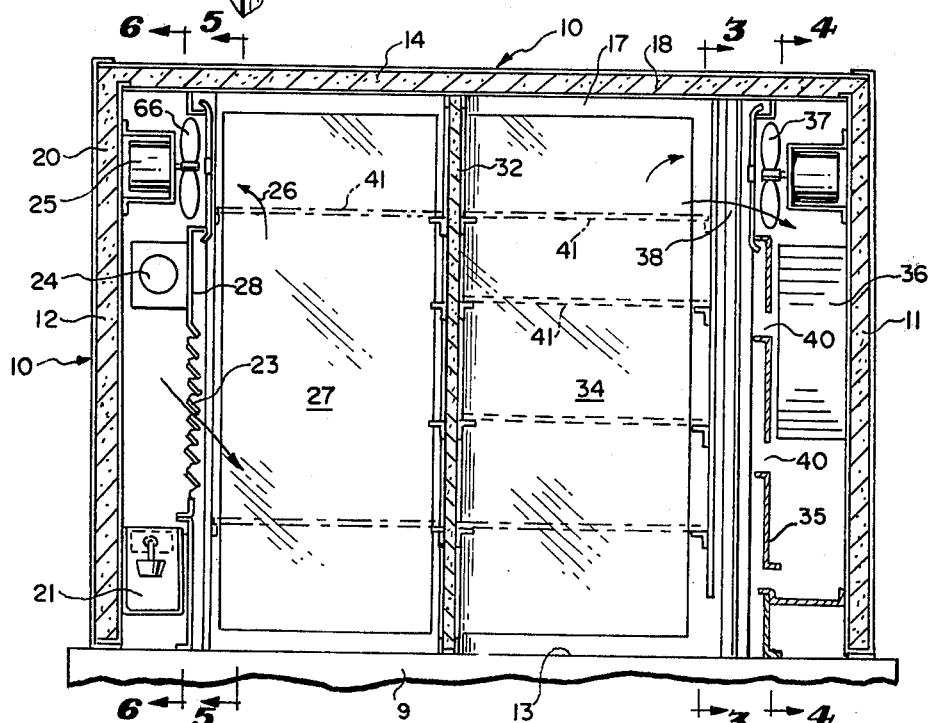
FIG. 2 is a longitudinal vertical section taken on line 2—2 of FIG. 1 illustrating the use of two compartments in a single cabinet separately for display of hot and cold food products.
Figure 3:
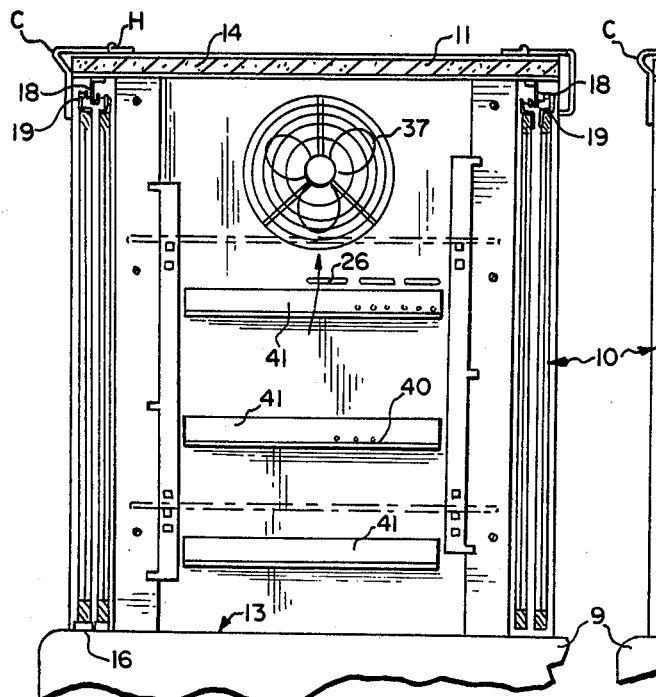
Figure 4:
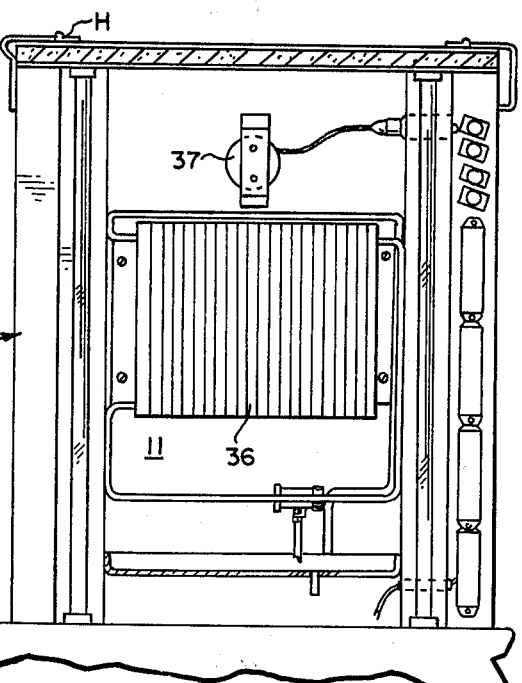
Figure 7:
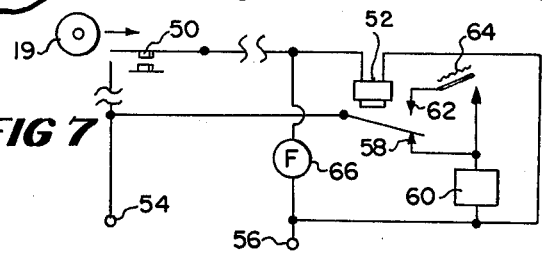

FIGS. 3, 4, 5 and 6 are inside sectional views taken on lines 3, 4, 5 and 6 respectively in FIG. 2, and FIG. 7 is a diagram of that portion of the electrical circuit related to air circulation and temperature recovery control after a door has been closed again.

DESCRIPTION OF THE INVENTION

Heretofore, although in the use of refrigeration for stored food preservation the trade standard of holding food products at a temperature of 40° F. (4° C.) (cut in pressure 40 P.S.I. and cut out at 14 P.S.I.) has not been without danger of objectionable frosting and gradient freezing occurring where closure doors are opened often and the recovery control operates only at a conventional "pull down" rate which is also burdened with warm food that is to be refrigerated. On the other hand a high temperature occurs with an overheated cabinet whose control does not prevent a temperature overshoot by heat supply augmentation after the doors are closed. A hot serving temperature would preferably be 140° F. (60° C.).

Several advantages are here attained which have heretofore discouraged proprietors regarding the use of shelved cabinets because glass doors are not easily operated nor adequately insulated to establish and maintain optimum food preservation conditions and temperatures as well as displaying the food adequately without opening doors to see it. Also, the replenishing of a cabinet, or a section therefore, can be readily accomplished without interference with customers serving themselves.

In the present invention, conserving useful storage space, whether it be refrigerated, or heated and/or humidified, the air stream is taken from a location not likely to be exposed to incoming room air, and is processed, and returned to the space horizontally as soft flow in vertically spaced paths related to the shelves in the cabinet which, for use with cooled air, are preferably wider at the bottom than the top, particularly where the cabinet is of a rated access opening and volume.

The cabinet air is drawn horizontally by a fan from the top of the cabinet space and directed downwardly at one end of the cabinet through a vertically extending unit of heat exchange coils that are mounted close to a partition having gradient sized openings at the shelf levels. The progressively moving treated air is exhausted horizontally over the shelves with a gradient temperature factor at the ports for maximum heat exchange with the food on the shelves.

Instrumentation that responds in relation to the time that air circulation is cut off while a door is open, is used upon the closing of the door to accelerate rapidly the restoration of the controlled condition and circulation of the air which existed prior to the opening. A fast "recovery" arrangement is provided which, healthwise, quickly restores without "frosting" and maintains desired temperature conditions as well as desirable moisture conditions during and between servings when the self closing doors are closed, and particularly when the doors are likely to be opened often, or for substantial periods of time for serving or replenishment.

Moreover, in providing cabinet compartments to serve as a storage and display dispenser selectively humidified and heated by free steam and warm air as well as refrigerated, it was discovered that one or more refrigeration and warming units adapted for installation in the same cabinet can not only be alternatively operated for refrigeration purposes and warming, including useful circulation of air in the storage-display compartment, but also can safely accommodate refrigerating equipment that qualifies with a substantially contant preserving temperature of 40° F. (4° C.) required by law for refrigerated storage of food products. Furthermore, either one or both are usable in the same cabinet for selective or simultaneous operation with the cabinet functioning for alternate operations or divided into compartments by a transparent divider for simultaneous operation.

Furthermore, except in conventional objectionally slow recovery storage refrigerators, generally related to equipment cost, where doors are kept closed continuously for both high and low temperatures, the forced-air food-conditioning cabinets that are conventionally operated just above the freezing point of water are confronted with objectionable condensation and sweating, when the doors are opened. This results in drops of water collecting on the walls and on food products which sometimes is referred to as "rain" and, cabinets utilizing forced circulation of air that is humidified by heat evaporated water, have a tendency to dry out moisture from the remaining stored food products after the doors are closed. In the invention, in both instances, when the doors are open to supply or remove food, instrumentation paces the time of openness and augments the desired characteristics of the cabinet air to eliminate the conventional undesirable overshoot or slow recovery results.

Referring to the drawings of the invention in detail, a cabinet 10 mounted on a base 9 and housing equipment is illustrated showing two thermally insulated endwalls 11 and 12, a bottom wall 13, a top wall 14, and side wall frames defining on opposite sides, open sliding door openings 15 bordered in part at the top and bottom by inclined roller tracks. The bottom tracks 16 could support centrally overlapping glass doors 17 as guided at the top by tracks 18 secured thereto, but preferably for clean-up cleanliness the doors are supported on the upper tracks 18 by lift off rollers 19 movable beneath decorative caps C pivotally mounted by hinges H so that either door can be opened to overlap the other door or be removed at opposite ends of the tracks for full access to the cabinet so that the compartments and guides can be readily cleaned from either side if there is spillage.

One end wall 12 has a heatable water trough, or tank 21, next to it supported on the bottom wall 13 behind a spill protective partition 28 through which fluid can pass from the tank side to the compartment 27 through downwardly and inwardly inclined louvres 23 and also to prevent spills in the compartment from contaminating the tank 21 to direct the air circulation downwardly and inwardly into the compartment 27.

A variable heater 24, preferably electrical, is located above and behind the louvres 23. A blower 25, when energized, draws air from the top of the compartment 27, as indicated by arrow 26, and forces it over the heaters for warmth, and, to pick up moisture from the tank 21, before returning to the compartment 27 through the louvres 23 in a counterconvective direction of circulation.

The heater 24 and steam generators in the tank 21 may be employed jointly or separately to condition the air in the compartment depending upon the instructions of a chef. A bulb 29 responsive to the temperature in the heater and a thermostat 30 controlled by a manual switch 31 actuates a heater coil in heater 24 and the heated air is tempered by the moisture before contacting the food displayed.

Although, the sliding doors are preferably self closing by gravity on inclined tracks they may be closed by weights if desired, and control switches actuated when any door is open an appreciable distance conventionally control the heating, cooling and humidity.

Figure 5:
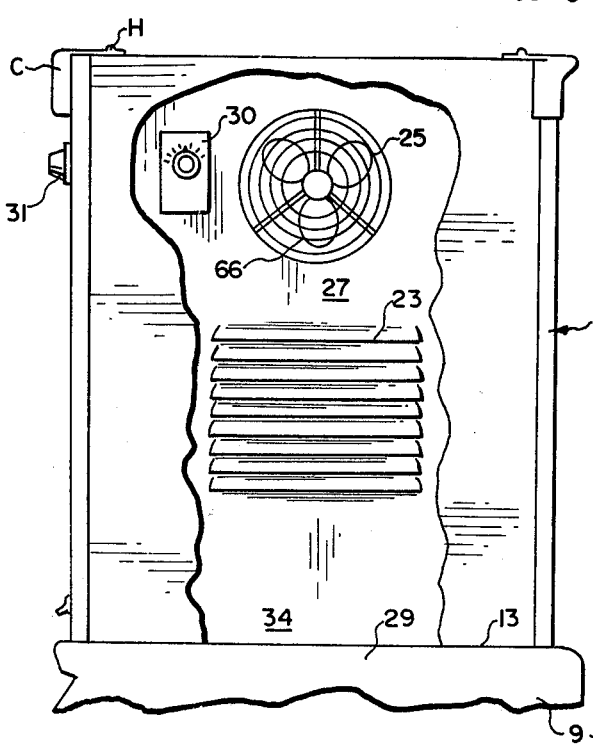
Figure 6:
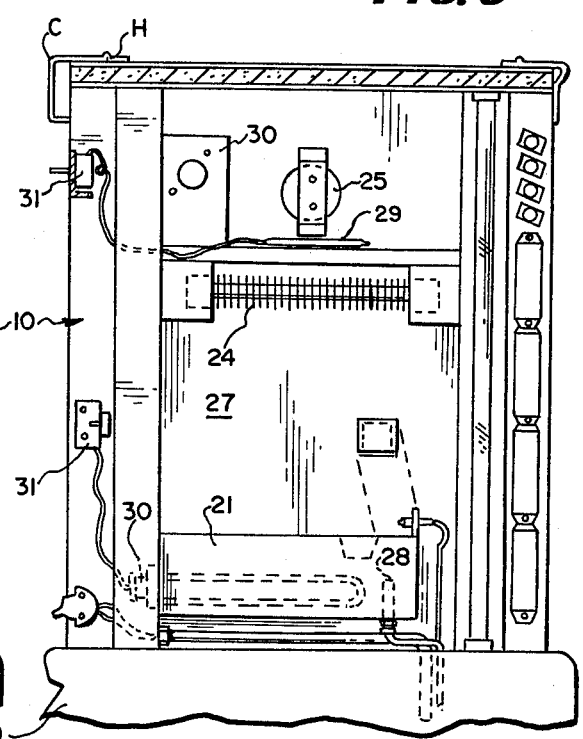

For rapid recovery without concentration of heat exchange, the compartment 27 is illustrated in FIGS. 5 and 6 as a warming cabinet, or compartment, with continuous air circulation for cabinet air flowing over the vertically oriented flow fins for heater 24 above the louvres 23 covering it. Gradient heating is not required because there is no health requirement as to limitation of temperature, but at the option of the cabinet owner the water trough 21 can be received in the bottom which preferably has a heater in it and the humidity generated can be maintained in the cabinet with or without the heater 24 being energized.

The base 9 of the cabinet is cooled or warmed through by the wall 13 with its air positively circulated thereover by a fan (not shown) to serve as standby for the storage of extra prepared food if desired.

A removable partition 32 establishes and separates a cooling compartment 34 from a heating compartment 27 whose other end wall 35 houses a conventional refrigerant expansion coil arrangement 36 through which air is driven by the blower 37 downwardly as indicated by the arrow 38.

The wall 35 has horizontally disposed openings 40 through which refrigerated air is progressively supplied to the compartment preferably below and individually to each foraminated shelf 41 for upward movement in the compartment 34, the colder air blowing upwardly and being freshly chilled for each shelf load of food, the accumulative refrigerating effect being designed for rather than the conventional warming effect upon the tiered shelves wherein an overchill for the lower shelves is incurred to adequately chill the upper shelves with the same forced circulation of air, or as an alternate, permit convective circulation to stratify with a like effect.

The level of the shelves 41 on opposite sides of the central partition 32 may be adjusted with respect to vertical spacing, but preferably are located as indicated so that the heat exchange air inlets 23 and 40 are substantially spread vertically for both compartments. The forced circulation is in the direction of convective circulation but initial chilled air contacts with the food is spread vertically to be substantially of even temperature through all openings. This substantially eliminates frosting on any of the shelves. In this way there is no lag or delay on all food receiving properly temporized air when the doors are open and closed.

Preferably for the control of the heat exchange equipment (FIG. 7), one normally open, roller actuated switch 50 is provided for each of the overlapping doors 17 as located in the track 18 either at the top or bottom of the door where it is actuated by the weight of the door when closed, thereby eliminating clearance questions that could otherwise be involved with the removal of the doors or the use of doors of various sizes. The door switches 50, as diagrammatically illustrated in FIG. 7, are connected in series for each compartment so that when any one or more are open a certain portion of an electric circuit is deactivated and another portion is energized.

In use, the first step is to turn off air blower circulation by opening at least one switch the moment any door is opened to prevent conditioned air losses. The heat exchanger continues to run for the time that air circulation is cut off while a door is open and upon the closing of the doors has developed the heat exchangability which can be adjusted by blower control or refrigerant expansion that augments and rapidly accelerates restoration of the air conditions and circulation which had existed before any doors had been opened. Such a fast recovery control, which healthwise quickly restores and maintains desired temperature conditions during and between servings, can be manually or automatically programmed to operate only during peak serving conditions when the doors are likely to be opened often or for substantial periods of time for serving or replenishment. A time accumulator (not shown) may handle this automatically based upon its run down time when the doors are closed again but with the temperature, humidity and air circulation controlled to prevent restoration overshoot if the doors are closed for any length of time, but the build up time is generally adequate to control the time for restoration after door closing.

As illustrated in FIG. 7 one of the switches 50 is diagrammatically illustrated with a door actuated roller 19 about to close it as the only switch 50 and door that may happen to be open at the time. The electric power connections are indicated at 54 and 56. When one of the switches 50 is open, a solenoid 52 is deenergized, closing a contact 58 which then provides power through a heat exchange device 60 that progressively either cools or heats a respective compartment at a maximum set rate to a predetermined safety ON-OFF temperature for the express purpose of providing a rapid recovery when all the doors are closed again. When all the doors are closed the solenoid 52 is energized by the closing of the switch 50. This closes contact 62 and places the control of the compartment temperature under the automatic thermostatic control 64 after the heat exchange device 60 has had the opportunity of running and building up its openness-time-potential-effectiveness without restraint while the door was open.

The timing of the door being open preferably energizes the air conditioning mechanism, refrigerator or heater, to develop a determinable reserve and when the doors are all closed again the compartment air circulating fan 66 is turned on to distribute quickly the built up air conditioning potential to restore quickly the temperature for which the compartment is set when the doors are closed a substantial length of time. The rapid recovery tapers as the recovery continues.

To the extent that separate compartments are present in the same cabinet, the conventional temperature recovery control, being simple and inexpensive, is relied upon for each compartment. Where a divider 32 is used plural elements 60 and 64 are generally used which are hot and cold controls respectively, and preferably both are provided for universality even though one or the other may not be used when the divider 32 is not used. The accelerated temperature change induced by the element 60 can be either a heater 24 or refrigerator 36, or humidifier 21.

The closing of all door switches 50 also turns on the air circulating fans 66 instantly for quick restoration of the originally selected display temperature and conditions.

With the removal of the partition which can be stored in the cabinet base, even by an electrical elevator (not illustrated) if desired, a dual equipped cabinet can be used at any given time for only one purpose, either for hot food or cold food, although equipped for both, thereby providing quick conversion versatility for particular types of cold or hot meal servings, at different times of the day, as desired. The alternate use merely requires selector switching as to which side is powered and controlled at any given time.

Otherwise, without the use of the partition the cabinet need only be and can be equipped for only single use.

Thus, as cold food dispensing is converted to a hot food selection, the character of the cabinet can be changed merely with the actuation of a switch relay, like relay 56, with 60 being an alternate heat exchanger device and, in either event, the desired single-purpose automatic operation is in operation.

Accordingly, a dual equipped cabinet with the removable partition provides a four way versatility, and, as a single self contained multi purpose unit, fits in with other cabinets which may also be variously used where extra installations are required to handle the trade.

Moreover, with overnight temperature assured at 40° F. (4° C.), food can be left or stored overnight in the refrigeration sections of the cabinets without gradient temperatures at different levels.

What is claimed is:

1. In a food storage cabinet defining a compartment for storing and displaying food products at a predetermined temperature other than the ambient temperature outside said cabinet, the cabinet having door means movable between a closed and open position to provide access to said compartment, heat exchange means within said cabinet, temperature control means for controlling said heat exchange means to maintain said predetermined temperature in said compartment with said door means in the closed position, air circulation means operative when said door means is in the closed position to circulate air in a path in heat exchange relation with said heat exchange means and compartment, and means operative upon the movement of said door means away from said closed position to terminate the operation of said air circulation means and temperature control means and cause said heat exchange means to augment the temperature differential between said heat exchange means and said compartment during the period when said door means remains away from the closed position.

2. The storage cabinet of claim 1, wherein said means operative upon movement of said door means away from said closed position operates upon movement of said door means from an open to the closed position to restore the operation of said air circulation means and control means to rapidly lower the temperature differential between said heat exchange means and compartment and restore the compartment to said predetermined temperature.

3. The storage cabinet of claim 2, wherein said heat exchange means includes enclosure means within said cabinet, said enclosure means being formed to permit the circulation of air between said compartment and the interior of said enclosure means, and temperature generating means mounted within said enclosure means, said temperature control means being normally operative to control the activation and deactivation of said temperature generating means.

4. The storage cabinet of claim 3, wherein said enclosure means is formed by a vertical panel separating said temperature generating means from said compartment, said panel defining a heat exchange compartment extending along one end of said storage cabinet, said air circulation means being mounted within said heat exchange compartment above said temperature generating means to draw air from said compartment into said heat exchange compartment above said temperature generating means.

5. The storage cabinet of claim 4, wherein a plurality of vertically spaced horizontal shelves are mounted within said compartment, said vertical panel being provided with horizontally extending openings positioned beneath said horizontal shelves.

6. The storage cabinet of claim 4, wherein a source of humidity is mounted within said heat exchange compartment below said temperature generating means to coact with said circulated air in its lowest initial path of flow.

7. The storage cabinet of claim 3, wherein a divider wall is mounted within said compartment to divide said compartment into at least first and second subcompartments, said temperature generating means including a first enclosure and a first temperature generating unit mounted to control the temperature in said first subcompartment and a second enclosure and a second temperature generating unit mounted to control the temperature in said second subcompartment, said air circulation means operating to provide air flow in said first and second subcompartments away from said divider wall and downwardly through said first and second enclosures.

8. The storage cabinet of claim 7, wherein said first temperature generating unit includes an electric heater and said second temperature generating unit includes a refrigeration unit.

* * * * *